Figure 3:
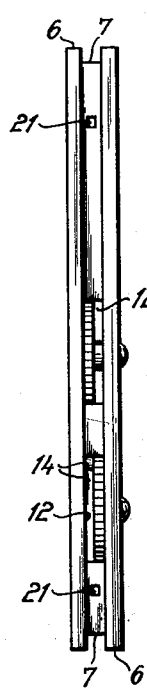

Nov. 29, 1960     H. LENHARDT     2,962,134

FRAME CORNER STRUCTURES

Filed Aug. 7, 1958

United States Patent Office 2,962,134
Patented Nov. 29, 1960

2,962,134
FRAME CORNER STRUCTURES
Heinrich Lenhardt, 16 Kurpfalzstrasse,
Kaiserslautern, Germany
Filed Aug. 7, 1958, Ser. No. 753,678
1 Claim. (Cl. 189—36)

This invention relates to frame corner structures and is concerned with frames such as picture or mirror frames or the like.

The invention has particular application to metal frames whose constituent frame bars are so shaped as to provide a support for two plates or panels and also to provide for the requisite spacing apart of the plates and panels. Frames having such particularly shaped bars have been hitherto proposed, for example, for the mounting of perpetual calendars having rotatable indicating discs. Such calendars normally comprise a front calendar panel and a rear covering panel equal in size to the front calendar panel, the front calendar panel and the rear covering panel being secured together by the shaped frame bars which are also employed to maintain a specific spacing of the panels from one another.

Hitherto proposed corner connections for such frames have either consisted of a relatively large number of individual components or else have only been capable of assembly or release with some difficulty, such as by driving, by means of a hammer or the like. Other hitherto proposed corner connections have also had the disadvantage that they were capable of assembly only by means of nuts and bolts. Furthermore in many cases the corresponding parts of these hitherto proposed corner connections upon assembly project laterally from the frame, so that the framed picture or the like cannot lie flush against the wall. The use of such known corner connections has also involved the disadvantage that the frame is connected laterally, with the result that the mitre joint produced at the opposite side of the frame is not pressed together, but gapes open in view of the unilateral tension exerted by the connection.

It is an object of the present invention to provide a frame corner structure in which the above mentioned disadvantages are substantially avoided or reduced.

According to the present invention there is provided a frame corner structure comprising two component frame bars having mutually abutting end portions and in which are respectively formed hook-retaining apertures and a spring connecting clip for said bars, said clip comprising two arms which are resiliently coupled together at one pair of ends so as to be biassed into enclosing an acute angle and which are respectively provided with hook-portions at the opposite ends, said arms respectively engaging said end portions with said hook portions respectively located in said apertures.

A frame corner structure constructed in accordance with the invention first of all affords the advantage that it can be assembled rapidly and simply and also constitutes an extremely reliable structure, which cannot be released accidentally even when subjected to considerable stress. Furthermore with such a structure any mitre joint produced will not gape open. The novel corner connection employed also enables the framed picture, calendar or the like to lie flush against the wall, since there are no parts which project laterally from the frame.

In addition, if the clip employed in accordance with the invention is used in frames for perpetual calendars of the type referred to above, there is obtained the particular advantage that the hitherto conventional additional connections of the front and rear panels by screw bolts which penetrate through the two panels are no longer necessary, and the calendar can be made of substantially simpler construction. In known calendars of this kind, the front panel and the rear covering panel are connected together by bolts in addition to being connected by the shaped frame bars. The bolts form at the same time the pivotal axes of the indicating discs and the ends of said bolts project from the front panel and are used for mounting a screen which surrounds the holes in the front panel and at the same time provides a certain amount of stiffening for the front panel. In order to ensure a constant spacing of the front panel from the covering plate, this construction requires in addition to the frame bars serving as spacer elements, special spacer rings which are provided in the region of the pivots of the indicating discs and which at the same time hold partly overlapping indicating discs in their correct position.

These additional bolts can be dispensed with when corner structures according to the invention are employed, since these structures provide for the connection of the flush-abutting frame bars to one another in such a rigid and reliable manner that even fairly stiff plates can be held together securely and satisfactorily by the frame bars. Thus there is no need for additional stiffening of the front panel by an attached screen and therefore there is no longer any need for the threaded bolts required for mounting such a screen, and these bolts can be replaced by shorter screw bolts, rivets or the like, which are no longer visible on the front panel. Furthermore, the rigid fixing of the plates dispenses with additional spacer elements between the front panel and the covering plate, without the rotation of the indicating discs being prevented or made difficult by excessive friction.

Figure 1:
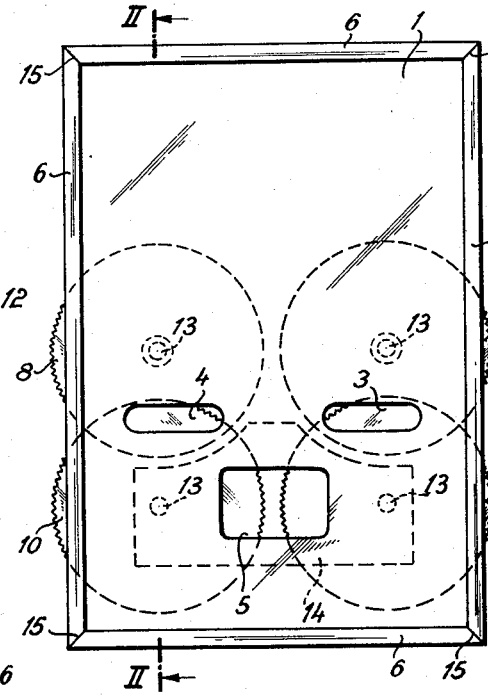
Figure 2:
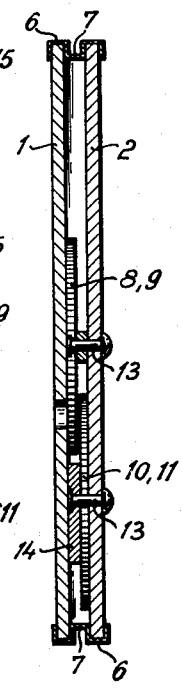
Figure 4:
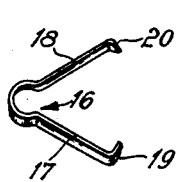
Figure 5:
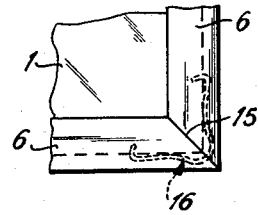

For a better understanding of the invention and to show how the same may be carried into effect reference will now be made to the accompanying drawings, in which:

Figure 1 is a front elevation of a perpetual calendar embodying frame corner structures in accordance with the invention, Figure 2 is a cross-sectional view through the calendar shown in Figure 1, Figure 3 is a side elevation of the calendar shown in Figure 1, Figure 4 is a perspective view of a spring clip used for connecting the frame bars, and Figure 5 is a view of a corner of the calendar showing the frame corner structure.

Referring to the drawings, 1 designates a front calendar panel and 2 the rear covering panel. The front panel 1 is provided with windows 3 and 4 for revealing the month and day of the week and a window 5 for showing the tens and units numbers of the date.

The rear covering panel 2 is connected to the front panel 1 merely by frame bars 6, each of which is provided with a centrally disposed longitudinal U-shaped groove 7, the walls of which form abutments against which the front panel 1 and the rear panel 2 bear tightly.

Mounted between the front panel 1 and the rear panel 2 are four indicating discs 8, 9, 10, 11 whose edge portions project through openings 12 in the frame bars 6. The indicating discs are rotatably mounted on rivets 13 which penetrate through the rear covering panel 2 and, in the case of each of the rivets for the indicating discs 8, 9 terminate flush with the front face of the respective disc. Each of the rivets 13 for the lower discs 10, 11 terminate in the same plane as the other rivets in a flat head, which is flush with the front face of an intermediate piece 14. The front panel 1 covers the rear covering panel 2 and bears directly on the front face of the two upper indicating discs 8, 9 and of the intermediate piece 14 and is held in this position merely by the frame bars 6.

The front and rear panels 1 and 2 are of relatively stiff construction and do not require any further spacing elements for holding them at the requisite distance apart from one another, this spacing being determined by the width of the inwardly projecting U-shaped groove 7 in the frame bars 6.

Each pair of two abutting frame bars 6 which abut at the bevelled edges 15 are connected together by spring clips 16 such as are illustrated in Figures 4 and 5. In the non-tensioned condition (Figure 4) the limbs 17, 18 of the clips enclose an acute angle. At their free ends, the limbs 17, 18 are respectively provided with hook-shaped bent-over portions 19, 20 by means of which the clips 16 engage in holes 21 which are formed in the floor of the groove 7. The holes 21 are shown more particularly in Figure 3, which is a side view of the calendar with the clips 16 removed.

When the clips 16 are inserted in position, they take up the position shown in Figure 5, in which they are in the tensioned state and connect the two frame bars fast to one another. This connection becomes particularly effective when the entire frame is positioned about the calendar and the last clip is inserted. The calendar is then surrounded by an elastic mount such that the front panel 1 and the rear covering panel 2 are uniformly held fast.

I claim:

A frame corner structure comprising two component frame bars having mutually abutting ends and in which are respectively formed hook-retaining apertures, and a spring connecting clip for said bars, said clip comprising two arms which are resiliently coupled together at one pair of ends so as normally to be biassed into enclosing an acute angle and which are respectively provided with hook-portions at the opposite ends, said arms respectively engaging said bars with said hook portions respectively located in said apertures so as to be forced apart and thereby bias said ends into abutment.

References Cited in the file of this patent

UNITED STATES PATENTS 2,081,722   Weinzierl _____ May 25, 1937